(12) United States Patent
Haynie

(10) Patent No.: US 10,526,428 B2
(45) Date of Patent: Jan. 7, 2020

(54) RECOVERY OF UNREACTED MONOMERS FROM OLEFIN POLYMERIZATION PROCESSES

(71) Applicant: ExxonMobil Chemical Patents Inc., Baytown, TX (US)

(72) Inventor: Steven P. Haynie, Dayton, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/579,721

(22) PCT Filed: Jun. 17, 2016

(86) PCT No.: PCT/US2016/038158
§ 371 (c)(1),
(2) Date: Dec. 5, 2017

(87) PCT Pub. No.: WO2017/023433
PCT Pub. Date: Feb. 9, 2017

(65) Prior Publication Data
US 2018/0162962 A1 Jun. 14, 2018

Related U.S. Application Data

(60) Provisional application No. 62/199,462, filed on Jul. 31, 2015.

(30) Foreign Application Priority Data

Aug. 31, 2015 (EP) .................................... 15183079

(51) Int. Cl.
| | | |
|---|---|---|
| C08F 6/00 | (2006.01) | |
| C08J 11/02 | (2006.01) | |
| B01D 47/05 | (2006.01) | |
| B01D 53/00 | (2006.01) | |
| C08F 10/02 | (2006.01) | |
| C08F 6/10 | (2006.01) | |

(52) U.S. Cl.
CPC .............. *C08F 6/005* (2013.01); *B01D 47/05* (2013.01); *B01D 53/002* (2013.01); *C08F 6/00* (2013.01); *C08F 6/10* (2013.01); *C08F 10/02* (2013.01); *C08J 11/02* (2013.01)

(58) Field of Classification Search
USPC ........................................................ 528/483
See application file for complete search history.

(56) References Cited

U.S. PATENT DOCUMENTS

| | | |
|---|---|---|
| 4,372,758 A | 2/1983 | Bobst et al. |
| 5,089,033 A | 2/1992 | Wijmans |
| 5,119,962 A | 6/1992 | Vercillo et al. |
| 5,376,742 A | 12/1994 | Krause |
| 7,582,723 B2 | 9/2009 | Penzo et al. |

FOREIGN PATENT DOCUMENTS

| | | |
|---|---|---|
| CN | 102161715 A | 8/2011 |
| EP | 0089691 A | 9/1983 |
| EP | 0475603 A | 3/1992 |
| EP | 0571826 A | 12/1993 |
| EP | 0801081 A | 10/1997 |
| EP | 2743279 A | 6/2014 |
| KR | 20100086504 A | 7/2010 |

*Primary Examiner* — Terressa Boykin
(74) *Attorney, Agent, or Firm* — Frank E. Reid

(57) ABSTRACT

A process, for recovery of unreacted olefin monomer(s) from a particulate product of an olefin polymerization reactor, the particulate polymer product is supplied to a degassing vessel, where the particulate product is countercurrently contacted with at least a first gaseous stripping stream, which includes at least 5% by weight unreacted olefin monomer, and then with an inert gas stream under conditions effective to strip hydrocarbon impurities from the polymer product and produce a stripped polymer product, is provided.

20 Claims, 1 Drawing Sheet

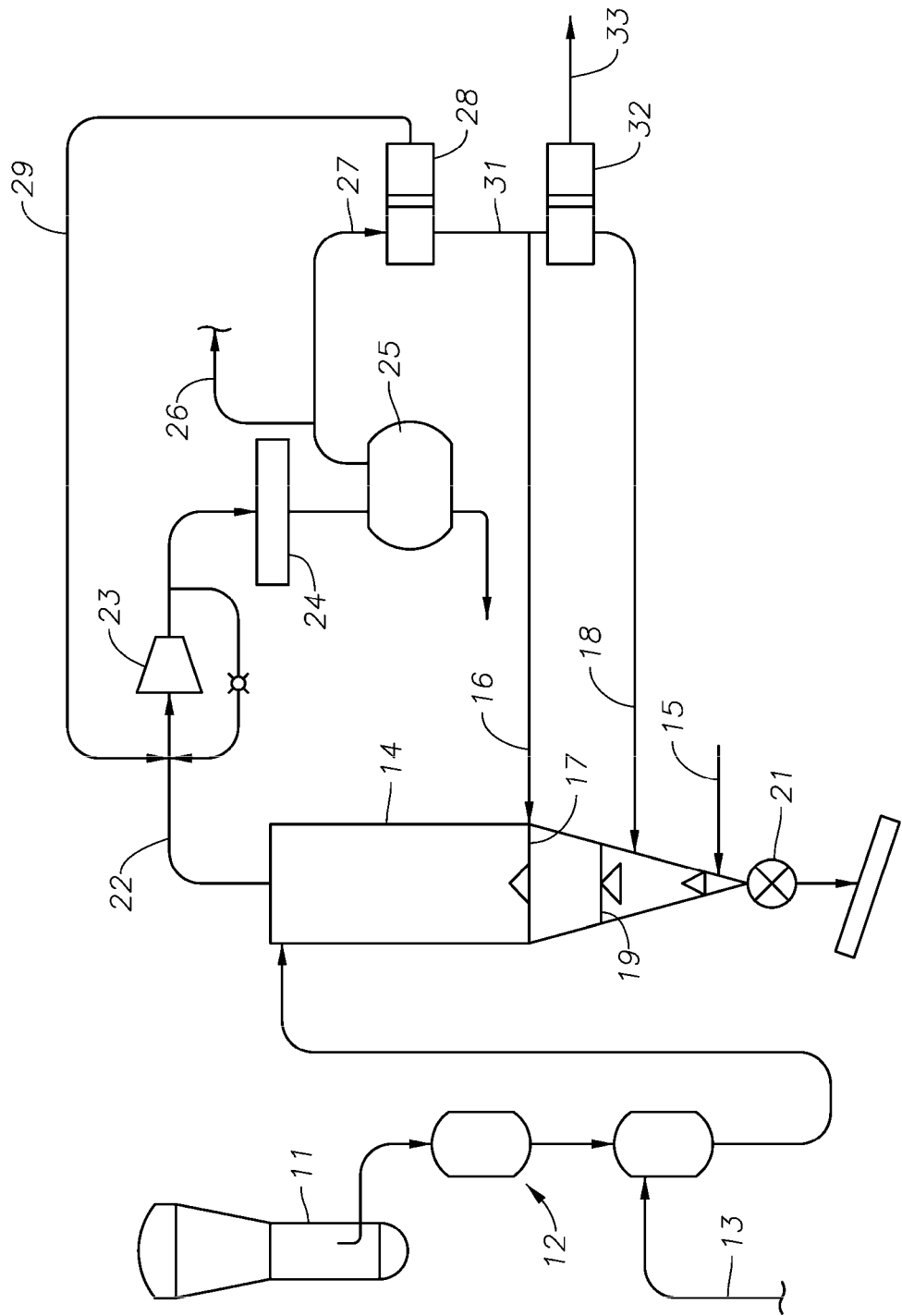

RECOVERY OF UNREACTED MONOMERS FROM OLEFIN POLYMERIZATION PROCESSES

CROSS REFERENCE TO RELATED APPLICATIONS

This application is a National Phase Application of International Application No. PCT/US2016/038158, field Jun. 17, 2016, and claims the benefit of Ser. No. 62/199,462, filed Jul. 31, 2015 and EP Application No. 15183079.1, filed Aug. 31, 2015, the disclosures of which are fully incorporated by reference in their entireties.

FIELD

This disclosure relates to the recovery of unreacted monomers from olefin polymerization processes and, in particular, gas phase olefin polymerization processes.

BACKGROUND

Gas-phase polymerization is an economical process for the polymerization of olefins, such as ethylene and propylene, and the copolymerization of ethylene and/or propylene with $C_4$-$C_8$ alpha-olefins. Such gas-phase polymerization processes can, in particular, be designed as gas-phase fluidized-bed processes in which the polymer particles are kept in suspension by means of a suitable gas stream. Processes of this type are described in, for example, EP-A-0 475 603, EP-A-0 089 691 and EP-A-0 571 826. Other background references include EP 0 801 081 A, EP 2 743 279 A, and CN 102 161 715.

In such processes, the polymer particles produced in the fluidized bed are discharged continuously or discontinuously from the reactor and conveyed pneumatically to a product recovery system. The polymer particles inevitably contain small amounts of unreacted monomer as well as heavier hydrocarbons added to, or produced in, the polymerization process. For example, the polymer particles may contain saturated homologues of the feed monomers produced by hydrogen supplied to the reactor to control the molecular product of the polymer and/or condensable liquids, such as $C_4$ to $C_6$ alkanes, added to assist in heat removal. Thus, the product recovery system includes a degassing or purging vessel where unreacted monomers and heavier hydrocarbons are stripped from the polymer particles normally by countercurrent contact with an inert gas, typically nitrogen. The resulting inert gas stream, diluted with unreacted monomer and heavier hydrocarbons is recovered from the purge vessel and, after separation of the hydrocarbon components, may be partially recycled as the conveying gas or, in another embodiment, as part of the purge stream. Part of the effluent from the purge vessel is removed from the system and currently, since the concentration of unreacted monomer in this stream is too low to render its recovery economically feasible, the vent stream is flared or used as fuel. This not only represents a significant loss of valuable monomer, but also results in regulated environmental emissions. There is therefore a need for an improved product purge system for gas phase olefin polymerization processes in which the loss of unreacted monomers in the product vent stream is reduced or eliminated.

SUMMARY

According to the invention, it has now been found that the feed olefins, such as unreacted ethylene, are an effective stripping medium for the hydrocarbon impurities entrained in the polymer product of gas phase olefin polymerization processes. Moreover, by using the unreacted feed olefin as a stripping medium, the amount of inert gas required for stripping can be reduced and the concentration of monomer in the vent gas can be increased to a level sufficient to allow its economic recovery.

Thus, in one aspect, the invention resides in a process for recovery of unreacted olefin monomer(s) from a particulate product of an olefin polymerization reactor, the process comprising:

(a) supplying the particulate polymer product of an olefin polymerization reactor to a degassing vessel, wherein the particulate polymer product contains hydrocarbon impurities, including unreacted olefin monomer;

(b) countercurrently contacting the particulate polymer product in the degassing vessel with at least a first gaseous stripping stream, which is recycled from (g) and comprises at least 5% by weight unreacted olefin monomer, under conditions effective to strip hydrocarbon impurities from the polymer product and produce a first stripped polymer product;

(c) countercurrently contacting the first stripped polymer product in the degassing vessel with an inert gas stream under conditions effective to strip hydrocarbon impurities from the first stripped polymer product and produce a second stripped polymer product;

(d) recovering the second stripped polymer product from the degassing vessel;

(e) removing from the degassing vessel a first gaseous effluent stream containing inert gas and hydrocarbon impurities, including unreacted olefin monomer, stripped from the particulate polymer product;

(f) recovering unreacted olefin monomer from a portion of the first gaseous effluent stream; and (g) recycling a further portion of the first gaseous effluent stream to (b) as the first gaseous stripping stream.

BRIEF DESCRIPTION OF THE DRAWINGS

FIG. 1 is a schematic illustration of part of the product recovery section of a gas phase ethylene polymerization process according to one embodiment of the present invention.

DETAILED DESCRIPTION OF THE EMBODIMENTS

The present disclosure is directed to the recovery of unreacted olefin monomers from olefin polymerization processes. The present recovery method is generally applicable to a wide variety of olefin polymerization processes, including (1) gas-phase polymerization processes, including fluidized bed, horizontal stirred bed and vertical stirred bed reactors, (2) bulk processes, including liquid pool and loop reactors, and (3) slurry processes, including continuous stirred-tank, batch stirred-tank, loop and boiling butane reactors. The present process is, however, particularly useful for the recovery unreacted monomers from the gas phase polymerization of ethylene, propylene, and mixtures of ethylene and/or propylene with $C_4$-$C_8$ alpha-olefins. For simplicity, the ensuing discussion will therefore focus on the application of the present recovery method to gas phase polymerization processes.

In gas phase olefin polymerization processes, the desired olefin monomer(s) are contacted with a catalyst carried by solid particles from which the polymer chains grow. The catalyst particles are normally fluidized in a fluidized bed reactor by a gas stream containing the monomer(s). The polymer produced in the fluidized bed is discharged continuously or discontinuously from the reactor and conveyed pneumatically to a product recovery system. The polymer particles inevitably contain small amounts of unreacted monomer as well as heavier hydrocarbons added to, or produced in, the polymerization process. For example, the polymer particles may contain saturated homologues of the feed monomers produced by hydrogen supplied to the reactor to control the molecular product of the polymer. In addition, since the polymerization reaction is exothermic, condensable liquids, such as $C_4$ to $C_6$ alkanes, may be added to the reactor to assist in heat removal. These higher alkanes are vaporized in the reactor and become entrained in the polymer product exiting the reactor.

The unreacted monomers and heavier hydrocarbons that are entrained in the polymer product must be removed before the polymer product is sent to storage or further processing. Thus, after leaving the reactor product, the polymer powder is conveyed, typically by a stream of nitrogen or other inert gas, into a degassing or purging vessel, where unreacted monomers and heavier hydrocarbons are stripped from the polymer particles normally by countercurrent contact with a stripping gas.

In conventional systems, the requisite stripping is accomplished by blowing a stream of an inert gas, normally nitrogen, countercurrently up from the bottom of the degassing vessel through the polymer flowing down from the top of the vessel. This flushes out entrained reactor gas and strips and desorbs dissolved hydrocarbons out of the product powder. The gaseous effluent stream exiting the top of the degassing vessel contains these desorbed hydrocarbons but is composed mainly of nitrogen. As a result, recovery of unreacted olefins from this effluent stream is currently not economically feasible and so the effluent stream is typically disposed of by burning it in a flare stack. This represents a substantial economic loss to polyolefin producers. Also, there is a continually rising cost of disposing of the vent gas to meet air quality protection codes.

The present process seeks to address this problem by initially contacting the particulate polymer product in the degassing vessel with at least a first gaseous stripping stream containing unreacted olefin monomer, before the polymer product is purged with an inert gas stream, normally nitrogen. The conditions in the degassing vessel are not closely controlled, but typically include a temperature from 20 to 120° C., such as from 65 to 85° C. and a pressure from 100 to 200 kPa-a, such as from 130 to 165 kPa-a. Under these conditions, the first gaseous stripping stream is effective to strip part of the hydrocarbon impurities from the polymer product, while the inert gas stream removes the remainder of the impurities. By substituting unreacted olefin monomer for at least part of the inert gas required for product purging, the concentration of monomer in the effluent from the degassing vessel can be increased. As the concentration of ethylene in degassing effluent increase, economically feasible recovery options become available. In addition, the amount of fresh inert gas that must be supplied to the degassing vessel can be decreased. In one embodiment, the weight ratio of fresh inert gas to the first gaseous stripping stream supplied to the degassing vessel is from 0.01 to 10.

In embodiments, the first gaseous stripping stream may contain at least 5 wt %, such as at least 10% by weight, for example at least 20% by weight, such as at least 30% by weight, unreacted olefin monomer and in some cases up to 50% by weight, such as up to 60% by weight, even up to 70% by weight, unreacted olefin monomer. In other embodiments, the particulate polymer product may be contacted in the degassing vessel with at least first and second gaseous stripping streams containing different concentrations of unreacted olefin monomer, before the polymer product is purged with the inert gas stream, normally nitrogen. For example, the particulate polymer product may be contacted with a first gaseous stripping stream comprising at least 25% by weight unreacted olefin monomer and then with a second gaseous stripping stream comprising less than 25% by weight unreacted olefin monomer. In embodiments, the first gaseous stripping stream may contain at least 30% by weight, such as at least 40% by weight, unreacted olefin monomer and in some cases up to 50% by weight, such as up to 60% by weight, even up to 70% by weight, unreacted olefin monomer. In addition, the second gaseous stripping stream may contain less than 20% by weight, such as less than 10% by weight, for example less than 5% by weight, even as low as 1% by weight unreacted olefin monomer.

The first gaseous stripping stream and, where applicable, the second gaseous stripping stream, are obtained by separating and recycling one or more portions of the gaseous effluent stream from the degassing vessel. As discussed above, this effluent stream comprises inert gas and the hydrocarbons stripped from the polymer product, that is unreacted monomer and normally heavier hydrocarbons. Thus, a suitable separation process for obtaining the required recycle streams comprises compressing and cooling the gaseous effluent stream from the degassing vessel to condense a liquid stream containing at least part of the heavy hydrocarbon impurities and leave a second gaseous effluent stream comprising inert gas, unreacted monomer and normally some residual heavier hydrocarbons. At least part of the second gaseous effluent stream can then be further separated, for example, to remove at least one stream sufficiently rich in unreacted monomer to facilitate monomer recovery, before part or all of the remainder of the second gaseous effluent stream is recycled to the degassing vessel as a gaseous stripping stream. Suitable methods of separation are discussed below.

In one embodiment, at least part of the second gaseous effluent stream is supplied to a first membrane separator to separate the second gaseous effluent stream into a first fraction rich in heavy hydrocarbon impurities as compared with the second gaseous effluent stream and a second fraction lean in heavy hydrocarbon impurities as compared with the second gaseous effluent stream. The first fraction can then be recycled to the compressing and cooling step to recover additional heavy hydrocarbons, while the second fraction is partially directed to monomer recovery and partially recycled to the degassing vessel as a gaseous stripping stream. For example, the second fraction from the first membrane separator may be supplied to a second membrane separator to remove a third fraction rich in unreacted olefin monomer as compared to the second fraction and leave a fourth fraction lean in unreacted olefin monomer as compared to the second fraction. The third fraction can then be routed to monomer recovery, while the fourth fraction is recycled to the degassing vessel as part or all of the first or second gaseous stripping stream.

Recovery of unreacted monomer from the second gaseous effluent stream, the second fraction and/or from the third fraction in the embodiments described above can be conducted by any known method for separating inert gases, such as nitrogen, from lower olefins, such as ethylene.

In one embodiment, recovery of unreacted monomer is performed by a process comprising contacting the relevant olefin-enriched fraction of the first gaseous effluent stream with an absorption solvent stream in an absorption zone, typically at a temperature less than 25° C. The solvent selectively dissolves the hydrocarbons in the gaseous feed to produce an absorption zone overhead gas stream comprising the inert gas and an absorption zone bottoms liquid stream comprising absorption solvent, unreacted monomer and any remaining heavy hydrocarbons. The bottoms liquid stream is fractionated in a distillation column to produce a distillation column bottoms stream comprising the absorption solvent which is recycled to the absorption zone, and a distillation column overhead stream comprising the unreacted monomer and reactor byproduct. The distillation column overhead stream is further fractionated in a splitter column to reject the reactor byproduct as a bottoms stream. The recovered monomers from the splitter overhead can then be conveyed back to the reactor. In one embodiment, the absorption solvent comprises at least 90% by weight of $C_5$ and $C_6$ hydrocarbons and preferably $C_5$ and $C_6$ hydrocarbons derived from the reactor waste gas stream(s) so that no external solvent is required.

In another embodiment, recovery of unreacted monomer may be conducted using a solid adsorbent, such as molecular sieve, which selectively sorbs hydrocarbons in a hydrocarbon/inert gas mixture. Such an adsorbent could be employed in, for example, a pressure swing adsorption apparatus.

In one embodiment, the monomer comprises ethylene, either alone or in combination with one of more $C_3$-$C_8$ alpha-olefins, and the inert gas stream comprises nitrogen containing less than 1% by weight, and preferably no measurable quantity, of ethylene.

Referring to the drawings, FIG. 1 is a simplified view of part of the product recovery section of a gas phase ethylene polymerization process according to one embodiment of the present invention. In the process shown in FIG. 1, ethylene is polymerized in a gas phase reactor 11 and particulate polyethylene product is discharged from the reactor 11 and fed to a plurality of product discharge tanks 12. Entrained with the particulate polyethylene product are unreacted ethylene monomer and $C_4$ to $C_6$ alkanes added to the reactor 11 to assist in heat removal during polymerization.

An assist gas is supplied to the product discharge tanks 12 via line 13 to convey the particulate polyethylene product to the upper end of a vertically disposed degassing vessel 14 which, at its lower end, receives a supply of fresh nitrogen purge gas via line 15. The degassing vessel 14 also receives a supply of a first ethylene-containing recycle gas via line 16 and a first distributor ring 17 and a supply of a second ethylene-containing recycle gas via line 18 and a second distributor ring 19. Each distributor ring distributes its respective recycle gas evenly into the degassing vessel, with the second distributor ring 19 being located closer to the lower end of the degassing vessel 14 than the first distributor ring 17.

As the particulate polyethylene product flows downwardly through the degassing vessel 14, it is sequentially contacted by the first ethylene-containing recycle gas, the second ethylene-containing recycle gas and the nitrogen purge gas flowing upwardly through the degassing vessel 14. As a result, the unreacted ethylene monomer and $C_4$ to $C_6$ alkanes entrained in the particulate polyethylene product are stripped from the product and exit the degassing vessel 14 with the nitrogen purge gas as a first gaseous effluent stream. The stripped polyethylene product collects at the lower end of the degassing vessel 14, from which it can be removed via valve 21 for further processing.

The first gaseous effluent stream is fed via discharge line 22 to a compressor 23 and then a cooler 24 so as to condense at least part of the $C_4$ to $C_6$ alkanes in the first effluent stream. The pressurized and cooled first effluent stream is then fed to an accumulator 25 where the condensed alkanes and alkenes are separated and recovered via line 16 to leave a second gaseous effluent stream. Part of the second gaseous effluent stream is removed from the accumulator 25 via line 26 and recycled as assist gas in line 13, while the remainder of the second gaseous effluent stream is supplied by line 27 to a first membrane separator 28.

The first membrane separator 28 separates the second gaseous effluent stream into a first fraction rich in heavy hydrocarbon impurities as compared with the second gaseous effluent stream and a second fraction lean in heavy hydrocarbon impurities as compared with the second gaseous effluent stream. The first fraction is recycled via line 29 to the input of the compressor 23, while the second fraction is removed via line 31 with a first portion being supplied to line 16 as the first ethylene-containing recycle gas and a second portion being fed to a second membrane separator 32.

The second membrane separator 32 separates the second portion of the second fraction of the second gaseous effluent stream into a third fraction rich in unreacted olefin monomer as compared with the second fraction and a fourth fraction lean in unreacted olefin monomer as compared with the second fraction. The third fraction is then sent to ethylene recovery via line 33 while the fourth fraction is recycled via line 18 as the second ethylene-containing recycle gas.

In a modification of the embodiment shown in FIG. 1 (not shown), the line 16 is omitted so that the entire second fraction from the first membrane separator 28 is supplied via line 31 to the second membrane separator 32. The fourth fraction is then recycled via line 18 as the first ethylene-containing recycle gas.

In a further modification of the embodiment shown in FIG. 1 (not shown), the fourth fraction in line 18 is combined with the second fraction portion in line 16 and the combined stream is recycled to the degassing vessel as the first ethylene-containing recycle gas.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for recovery of unreacted olefin monomer(s) from a particulate product of an olefin polymerization reactor, the process comprising:
   (a) supplying a particulate polymer product of an olefin polymerization reactor to a degassing vessel, wherein the particulate polymer product contains hydrocarbon impurities, and wherein the hydrocarbon impurities comprise unreacted olefin monomer;
   (b) countercurrently contacting the particulate polymer product in the degassing vessel with a first gaseous stripping stream and a second gaseous stripping stream under conditions effective to strip a first portion of the hydrocarbon impurities from the polymer product and produce a first stripped polymer product, wherein the first gaseous stripping stream has a different composition than the second gaseous stripping stream;
   (c) countercurrently contacting the first stripped polymer product in the degassing vessel with an inert gas stream under conditions effective to strip a second portion of the hydrocarbon impurities from the first stripped polymer product and produce a second stripped polymer product;
   (d) recovering the second stripped polymer product from the degassing vessel;
   (e) removing from the degassing vessel a first gaseous effluent stream containing the inert gas and at least a portion of the hydrocarbon impurities stripped from the particulate polymer product;
   (f) recovering unreacted olefin monomer from a first portion of the first gaseous effluent stream; and
   (g) recycling a second portion of the first gaseous effluent stream to the degassing vessel as the first gaseous stripping stream.

2. The process of claim 1, wherein the conditions in the degassing vessel include a temperature from 20° C. to 120° C.

3. The process of claim 1, wherein the conditions in the degassing vessel include a pressure from 100 kPa-a to 200 kPa-a.

4. The process of claim 1, wherein the second portion of the first gaseous effluent stream comprises at least 10% by weight of unreacted olefin monomer.

5. The process of claim 1, wherein the particulate polymer product further contains hydrocarbon impurities that are heavier than the unreacted olefin monomer, and the process further comprises:
   (h) compressing and cooling the first gaseous effluent stream to produce a condensed liquid stream containing at least part of the heavy hydrocarbon impurities and leave a second gaseous effluent stream; and
   (i) recovering unreacted olefin monomer from a first portion of the second gaseous effluent stream and recycling a second portion of the second gaseous effluent stream to the degassing vessel as the first gaseous stripping stream.

6. The process of claim 5, further comprising:
   (j) supplying at least part of the second gaseous effluent stream to a first membrane separator to separate the second gaseous effluent stream into a first fraction rich in the heavy hydrocarbon impurities and a second fraction lean in the heavy hydrocarbon impurities;
   (k) compressing and cooling the first fraction;
   (l) recovering unreacted olefin monomer from a first portion of the second fraction; and
   (m) recycling a second portion of the second fraction to the degassing vessel as the first gaseous stripping stream.

7. The process of claim 6, wherein the recovering step (1) comprises:
   (i) supplying the first portion of the second fraction to a second membrane separator to remove a third fraction rich in unreacted olefin monomer and leave a fourth fraction lean in unreacted olefin monomer;
   (ii) recovering unreacted olefin monomer from the third fraction; and
   (iii) recycling the fourth fraction to the degassing vessel as the second gaseous stripping stream.

8. The process of claim 1, wherein the second gaseous stripping stream countercurrently contacts the particulate polymer product after the first gaseous stripping stream but before the inert gas stream.

9. The process of claim 1, wherein the first gaseous stripping stream comprises at least 25% by weight of unreacted olefin monomer and the second gaseous stripping stream comprises less than 25% by weight of unreacted olefin monomer.

10. The process of claim 1, wherein recovering unreacted olefin monomer in (f) comprises contacting a portion of the first gaseous effluent stream with an absorption solvent stream in an absorption, zone to produce an absorption zone overhead gas stream comprising the inert gas and an absorption zone bottoms liquid stream comprising absorption solvent and unreacted olefin monomer.

11. The process of claim 10, wherein the absorption solvent stream comprises at least 90% by weight of $C_5$ and $C_6$ hydrocarbons.

12. The process of claim 10, wherein contacting the portion of the first gaseous effluent stream with the absorption solvent stream is conducted at a temperature of less than 25° C.

13. The process of claim 1, wherein the weight ratio of the inert gas stream supplied to (c) to the first gaseous stripping stream recycled to (b) is from 0.01 to 10.

14. The process of claim 1, wherein recovering unreacted olefin monomer in (f) comprises contacting a portion of the first gaseous effluent stream with a solid adsorbent.

15. The process of claim 1, wherein the monomer comprises ethylene.

16. The process of claim 1, wherein the inert gas stream comprises nitrogen containing less than 1% by weight of ethylene.

17. The process of claim 1, wherein the first gaseous stripping stream comprises a greater amount of unreacted olefin monomer than the second gaseous stripping stream.

18. The process of claim 1, wherein the second gaseous stripping stream countercurrently contacts the particulate polymer product after the first gaseous stripping stream but before the inert gas stream, and wherein the first gaseous stripping stream comprises at least 25% by weight of unreacted olefin monomer and the second gaseous stripping stream comprises less than 25% by weight of unreacted olefin monomer.

19. The process of claim 1, wherein the second gaseous stripping stream countercurrently contacts the particulate polymer product after the first gaseous stripping stream but before the inert gas stream, and wherein the first gaseous stripping stream comprises at least 30% by weight of unreacted olefin monomer and the second gaseous stripping stream comprises less than 20% by weight of unreacted olefin monomer.

20. The process of claim 1, wherein the second gaseous stripping stream countercurrently contacts the particulate polymer product after the first gaseous stripping stream but before the inert gas stream, and wherein the first gaseous stripping stream comprises at least 40% by weight of unreacted olefin monomer and the second gaseous stripping stream comprises less than 10% by weight of unreacted olefin monomer.

* * * * *